(12) United States Patent
Cherivirala et al.

(10) Patent No.: US 11,962,647 B2
(45) Date of Patent: Apr. 16, 2024

(54) DATA MIGRATION USING DYNAMIC SYNCHRONIZATION

(71) Applicant: VMware LLC, Palo Alto, CA (US)

(72) Inventors: Kiran Kumar Cherivirala, Bangalore (IN); Venu Gopala Rao Kotha, Bangalore (IN); Anuj Khandelwal, Bangalore (IN); Gurivi Reddy Gopireddy, Bangalore (IN); Sureshbabu Koyadan Chathoth, Bangalore (IN); Venkata Vanaja Lakshmi Yakkala, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 239 days.

(21) Appl. No.: 16/532,528

(22) Filed: Aug. 6, 2019

(65) Prior Publication Data
US 2020/0389522 A1   Dec. 10, 2020

(30) Foreign Application Priority Data

Jun. 5, 2019   (IN) .............................. 201941022276

(51) Int. Cl.
*H04L 67/1095* (2022.01)
*G06F 9/455* (2018.01)
*H04L 67/59* (2022.01)

(52) U.S. Cl.
CPC ...... *H04L 67/1095* (2013.01); *G06F 9/45558* (2013.01); *H04L 67/59* (2022.05); *G06F 2009/45583* (2013.01); *G06F 2009/45595* (2013.01)

(58) Field of Classification Search
CPC ............ H04L 67/1095; H04L 67/2861; G06F 9/45558; G06F 2009/45583; G06F 2009/45595
See application file for complete search history.

(56) References Cited

U.S. PATENT DOCUMENTS

| | | | |
|---|---|---|---|
| 9,727,429 B1 * | 8/2017 | Moore | G06F 11/1658 |
| 10,061,657 B1 * | 8/2018 | Chopra | G06F 11/1461 |
| 10,579,283 B1 * | 3/2020 | Chopra | G06F 3/065 |
| 10,642,633 B1 * | 5/2020 | Chopra | G06F 9/45533 |
| 10,725,965 B1 * | 7/2020 | Rokicki | G06F 16/00 |

(Continued)

*Primary Examiner* — William G Trost, IV
*Assistant Examiner* — Abdelbasst Talioua
(74) *Attorney, Agent, or Firm* — King Intellectual Asset Management

(57) ABSTRACT

Examples can include (1) identifying, on a network, a source node and a destination node, the source node including at least one source node virtual machine ("VM") to be replicated as a destination node VM on the destination node, (2) performing a full synchronization by copying disks used by the source node VM in a current operational state to the destination node VM, (3) scheduling start times for multiple update synchronizations of changed data between the source node VM and the destination node VM, the start times being scheduled at different time intervals, wherein a first time interval is greater than a second time interval, and (4) performing, at a switch-over time, a shutdown of the source node VM and transmitting data changes that are pending on the disk to the destination node. Various corresponding systems, methods, and non-transitory computer-readable media are also disclosed.

20 Claims, 8 Drawing Sheets

(56) References Cited

U.S. PATENT DOCUMENTS

| | | | |
|---|---|---|---|
| 10,769,103 B1* | 9/2020 | Patwardhan | G06F 16/128 |
| 10,838,912 B1* | 11/2020 | Chopra | G06F 11/1458 |
| 11,099,946 B1* | 8/2021 | Chopra | G06F 11/1451 |
| 11,238,009 B1* | 2/2022 | Dhakras | G06F 11/1446 |
| 2009/0313311 A1* | 12/2009 | Hoffmann | G06F 11/2097 |
| 2011/0167298 A1* | 7/2011 | Lee | G06F 11/2097 |
| | | | 714/E11.131 |
| 2014/0019643 A1* | 1/2014 | Raju | H04L 67/60 |
| | | | 709/248 |
| 2016/0349820 A1* | 12/2016 | Baker | G06F 9/5088 |
| 2016/0358249 A1* | 12/2016 | Iyer | H04L 67/10 |
| 2017/0010941 A1* | 1/2017 | Shimada | G06F 11/1464 |
| 2017/0031779 A1* | 2/2017 | Helliker | H04L 67/60 |
| 2017/0262299 A1* | 9/2017 | Chow | G06F 9/45545 |
| 2017/0364415 A1* | 12/2017 | Formato | G06F 11/1464 |
| 2018/0060184 A1* | 3/2018 | Thakkar | G06F 11/1448 |
| 2018/0067819 A1* | 3/2018 | Kotha | G06F 11/1461 |
| 2019/0138342 A1* | 5/2019 | Dornemann | G06F 9/45558 |
| 2019/0235967 A1* | 8/2019 | Sharma | G06F 3/0619 |
| 2020/0042400 A1* | 2/2020 | Ashokkumar | H04L 67/1036 |
| 2020/0045134 A1* | 2/2020 | Rozas | G06F 3/067 |
| 2020/0192765 A1* | 6/2020 | Lyu | G06F 11/1469 |
| 2020/0241966 A1* | 7/2020 | Chopra | G06F 16/2358 |
| 2021/0103500 A1* | 4/2021 | Takahashi | G06F 11/1448 |
| 2021/0374012 A1* | 12/2021 | Calmon | G06N 20/00 |

* cited by examiner

DATA MIGRATION USING DYNAMIC SYNCHRONIZATION

RELATED APPLICATIONS

Benefit is claimed under 35 U.S.C. 119(a)-(d) to Foreign Application Serial No. 201941022276 filed in India entitled "DATA MIGRATION USING DYNAMIC SYNCHRONIZATION", on Jun. 5, 2019, by VMWARE, Inc., which is herein incorporated in its entirety by reference for all purposes.

BACKGROUND

With the expansion of cloud services, users can migrate virtual machines ("VMs") across datacenters that are geographically apart. Various software-based tools (for example, HCX by VMWARE) can allow users to migrate their VMs from on-premise datacenters (user-accessible servers that an entity can privately own and control) to cloud environments.

The software-based tools can support a bulk migration process. The bulk migration process can be performed using hypervisor-based VM replication and recovery software tool (for example, VSPHERE REPLICATION by VMWARE). In some examples, bulk migration can allow for a relatively large number of VMs to be migrated together. However, the VMs that are migrated can experience a downtime during a switchover window in which the source node VMs are formally transitioned to the destination node VMs.

The bulk migration can also be performed in a live migration process. In some examples, a software tool such as VMOTION by VMWARE can enable the live migration of live VMs from one server to another with reduced downtime. Further, such tools can allow for the migration of a relatively small number of VMs.

In some situations, users can schedule a relatively large number of VMs (for example, between 20 VMs to 200 VMs, or more) for bulk migration. Further, the users can lease pipelines to connect their on-prem datacenters to the cloud. These pipelines can carry network traffic along with the migration traffic. It can be difficult for users to configure certain migration parameters such as switchover windows because of an unpredictability of network usage. Accordingly, users can configure the migration parameters to be at relatively safe default levels. However, such a configuration can lead to relatively high bandwidth usage, as changed blocks of data on a source node VM can be repeatedly transmitted to the destination node VM.

As a result, a need exists for systems and methods that reduce bandwidth usage during VM migrations.

SUMMARY

Examples described herein include systems and methods for VM replication. In one example, the system can include a non-transitory, computer-readable medium containing instructions and a processor that executes the instructions to perform stages. The stages can include identifying, on a network, a source node and a destination node, the source node including at least one source node VM to be replicated as a destination node VM on the destination node. The stages can further include performing a full synchronization by copying disks used by the source node VM in a current operational state to the destination node VM. The stages can also include scheduling start times for multiple update synchronizations of changed data between the source node VM and the destination node VM, the start times being scheduled at different time intervals, wherein a first time interval is greater than a second time interval. The update synchronizations can be based on a user-configurable input, such as a recovery point objective ("RPO") or similar metric. The update synchronizations can also be automatically adjusted based on a relative percentage of data that needs synchronization based on multiple most recent synchronizations.

The multiple update synchronizations can have any suitable duration and can be user-configured. In some examples, the stages can include reducing respective durations of the multiple update synchronizations at a predetermined rate from a maximum update synchronization duration to a minimum update synchronizations duration. Accordingly, instead of performing synchronizing data between the source node VM and the destination node VM at regular update synchronization intervals based on an RPO, the system can dynamically configure the update synchronization intervals. For example, the system can configure larger update synchronizations intervals initially and gradually reduce the update synchronization intervals to smaller update synchronization intervals as a switchover window approaches. In this way, the system can initially send changing data blocks less frequently, thereby reducing network bandwidth usage. As the switchover window approaches, the system can synchronize data more frequently at shorter update synchronization intervals. In some examples, a number of the multiple update synchronizations or respective durations of the multiple update synchronizations can be based on at least one of a network latency or a data synchronization bandwidth usage. In some examples, the synchronization of data between the source node VM and the destination node VM can further include calculating that a time to transfer data changes is greater than or equal to a tolerance time. The synchronization can also include calculating that a difference between a maintenance window start time and a current time is greater than or equal to a buffer time. In some examples, the source node is located in a source data center and the destination node is located in a destination data center that is geographically separated from the source data center.

These stages can be performed by a system in some examples. Alternatively, a non-transitory, computer-readable medium including instructions can cause a processor to perform the stages when the processor executes the instructions.

Both the foregoing general description and the following detailed description are exemplary and explanatory only and are not restrictive of the examples, as claimed.

DESCRIPTION OF THE EXAMPLES

Figure 1A:
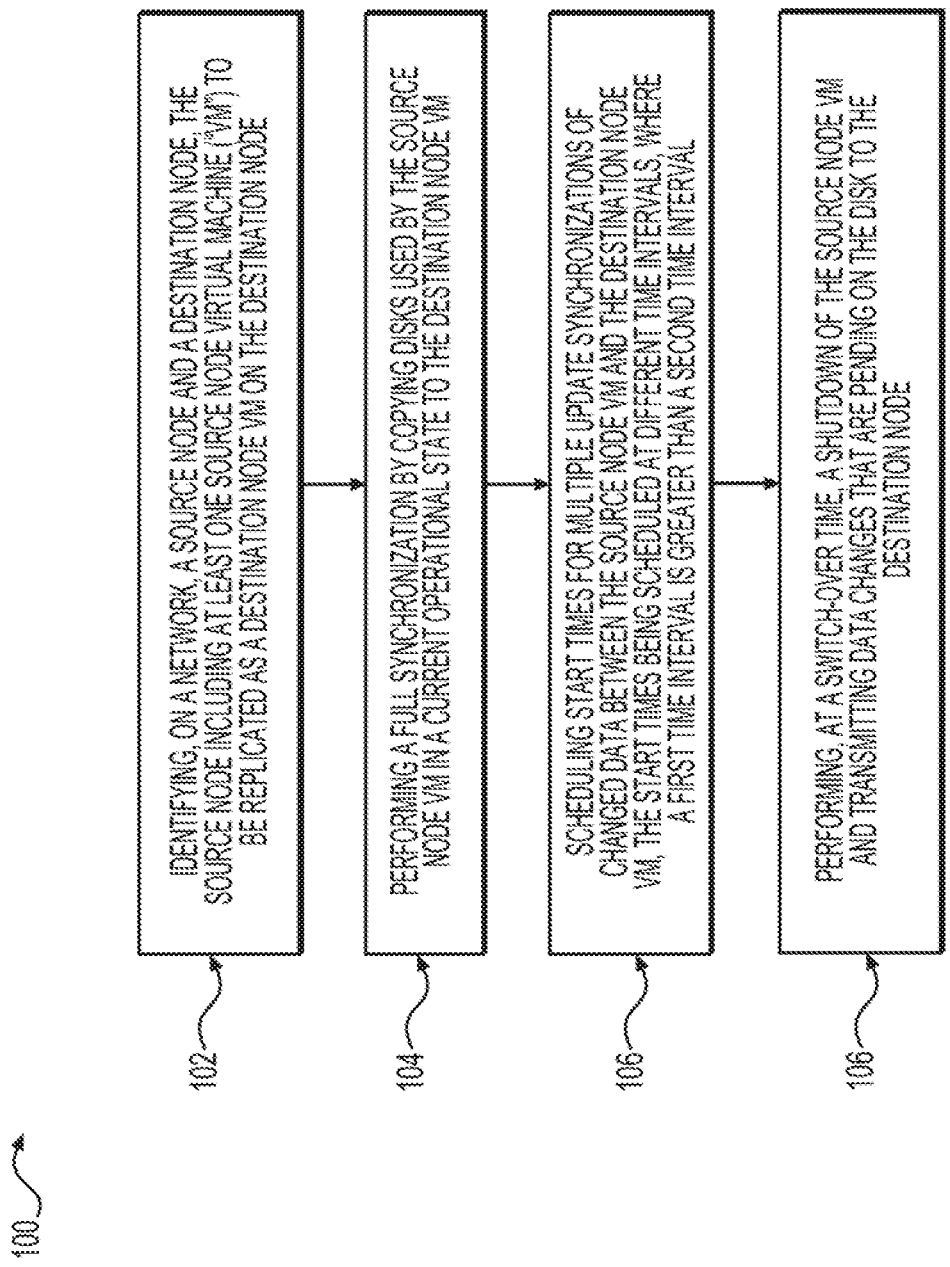
FIG. 1A is a flowchart of an example method for data migration using VM replication.

Reference will now be made in detail to the present examples, including examples illustrated in the accompanying drawings. Wherever possible, the same reference numbers will be used throughout the drawings to refer to the same or like parts.

As used herein, "virtualization," can refer to the process of creating a virtual (rather than physical) version of computer hardware platforms, storage devices, and computer network resources. Virtualization can facilitate the management and resource use in a datacenter. Virtualization can enable the creation of a dynamic datacenter and increase efficiency through automation while also reducing planned and unplanned downtime.

As used herein, a "data center" can refer to a building, a dedicated space within a building, or a group of buildings used to house computer systems and associated components, such as communications and storage systems. Datastores can refer to virtual representations of underlying physical storage resources in the datacenter. A datastore can serve as a storage location (for example, a physical disk) for virtual machine files. Datastores can hide the idiosyncrasies of the underlying physical storage and can present a uniform model for the storage resources required by VMs.

As used herein, a "VM" can refer to a software computer that, like a physical computer, runs an operating system and applications. The VM can include a set of specification and configuration files and can be supported by the physical resources of a host. A VM has virtual devices that provide the same functionality as physical hardware. The VM can have additional benefits over physical hardware in terms of portability, manageability, and security.

As used herein, a "host" can refer to a virtual representation of the computing and memory resources of a physical machine having memory and a processor. A host can represent the aggregate computing and memory resources of a physical server.

As used herein, "disaster recovery" can refer to a process that includes policies, tools, and procedures that enable the recovery or continuation of core technology infrastructure and systems following a natural or man-made disaster. Disaster recovery can focus on the information technology ("IT") or technology systems supporting critical business functions as opposed to business continuity, which can involve maintaining essential business functioning despite disruptive events.

As used herein, "cloud computing" can refer to an approach to computing that builds on virtualization's efficient pooling of resources to create an on-demand, elastic, self-managing virtual infrastructure that can be allocated dynamically as a service. The virtualization can enable cloud computing by uncoupling applications and information from the complexity of the underlying hardware infrastructure.

As used herein, "migration" can refer to the process by which a running VM running on a host computer under a hypervisor can be moved from one physical host to another with little or no disruption in service. The process may include selecting, preparing, extracting, and transforming data and transferring it from one computer storage system to another and can include the process of moving VMs. Additionally, the validation of migrated data for completeness and the decommissioning of legacy data storage can be considered part of migration.

As used herein, a "recovery point objective" ("RPO") can refer to a metric associated with the amount of data at risk in a data center or the like. The RPO can be determined by the amount of time between data protection events and can reflect the amount of data that could potentially be lost during a disaster recovery. The metric can be an indication of the amount of data at risk of being lost.

As used herein, a "recovery time objective" ("RTO") can refer to the amount of time it takes to recover from a data loss event and how long it takes to return to service. RTO refers then to the amount of time the system's data is unavailable or inaccessible preventing normal service. On the other hand, the RPO can refer to the maximum amount of data loss an enterprise is willing to accept as measured in time.

As used herein, "replication" can refer to a process for sharing information so as to ensure consistency between redundant resources, such as software or hardware components. Replication can improve reliability, fault-tolerance, or accessibility of such resources. In some examples, vSphere Replication™ can refer to a software tool by VMWARE that involves asynchronous replication that copies data from a users' primary site (for example, datacenter) to secondary sites (for example, the cloud). The vSphere Replication or similar software tool can be integrated in a hypervisor, enabling users to protect VMs regardless of the underlying storage solution, with an RPO ranging from 5 minutes to 24 hours.

As used herein, "switchover" can refer to the process of removing the access of users and applications from a source node on a network. Switchover can include migrating any last changes on a source node VM so that the source node VM and a destination node VM are in synchronization. Switchover can further include the resolution of any last-minute issues that might occur at this stage. Switchover can enable user and application access to the destination node VM, and can involve redirecting access to the destination node VM.

As used herein, "bandwidth" can refer to the rate of data transfer, bit rate, or throughput, and can be measured in bits per second (bit/s). A related term is "block," which, in data transmission and data storage, can refer to a sequence of bytes or bits, usually containing some whole number of records, and having a maximum length called a block size.

As used herein, "HCX" can refer to a software tool by VMWARE that can abstract on-premises private and public cloud resources and can present them to the applications as an end-to-end entity. HCX can provide secure and optimized multi-site connectivity to achieve cloud infrastructure hybridity.

In computer disk storage, a "sector" can refer to a subdivision of a track on a magnetic disk or optical disc. A given sector can store a fixed amount of user-accessible data. The sector can include the minimum storage unit of a hard drive.

While the present disclosure includes examples using VMWARE-based implementations, it is to be understood that embodiments of the present disclosure can be used in connection with any suitable virtualized network implementation.

As noted, software-based tools can allow users to migrate their VMs from on-premise datacenters to cloud environments. The software-based tools can support a bulk migration process. However, the VMs that are migrated can experience a downtime during a switchover window in which the source node VMs are formally transitioned to the destination node VMs.

In a general aspect, a bulk migration of VMs between a source node and a destination node can occur in the following stages. (1) A full synchronization can be performed. In full synchronization, a bulk migration tool such as HCX can copy the data on the source in current state. The bulk migration can involve copying the disks that a VM is using in their current state. After the full synchronization, a seed copy of data associated with the VMs can be created on the destination to minimize the time and bandwidth required for replication. The seed copy can include a VM disk file that can be positioned at the destination. (2) An online synchronization can be performed to account for changes to data on VM disks during the migration. While the full synchronization described above is being performed, the data on the VM disks can change. Accordingly, a replication process can track disk sectors that are changed during the full synchronization and the online synchronization. Based on a predetermined RPO, a metric reflecting the amount of time between data protection events, modified disk sectors are grouped and transferred from source to target. This online synchronization process can be repeated until the switchover window time is reached. (3) A switchover can be performed. The switchover of the VMs can start once the switchover window is reached. During this process, the source side VMs can be shut down and the remaining data disk changes that are pending can be transmitted to the destination node VMs and the destination side VM instance can be powered on.

As noted, in a bulk migration process, users can migrate relatively large number of VMs together (for example, about 20 to 200 VMs). Therefore, optimizing the data transmitted by the VMs can reduce the bandwidth usage on the network. This can reduce costs because public and private cloud providers often charge for bandwidth usage based on incoming and outgoing data from the cloud. The disclosed embodiments can reduce bandwidth costs by optimizing the data transmitted for the VMs during the bulk migration process.

In some cases, users can lease pipelines connecting their on-prem datacenters to public clouds. These pipelines can carry network traffic along with the migration traffic. Accordingly, users may not be able to predict time it takes for a full synchronization or an online synchronization processes to be completed, and when to schedule switchover windows. Often, users can configure the switchover window to be further out in time with respect to the initiation of the full synchronization to ensure that the VM's data is transferred.

As noted, the above approach can lead to a relatively high bandwidth usage on the network. For example, a user can schedule ten VMs to migrate and can configure the switchover window to be fifteen days away from the initiation of the migration. In this case, a full synchronization for VM1 can be completed after two days. For next thirteen days, VM1 can be in the online synchronization mode. During this state, changed blocks can be repeatedly transmitted to destination based on the RPO time. Users can often configure the RPO time to be minimum default RPO time. For example, for a VSPHERE by VMWARE replication process, the RPO time can be five minutes. Moreover, some data blocks on corresponding underlying disks used by the source node VMs can be changing continuously. Such data blocks can be transmitted to the destination side at the end of an RPO cycle (every five minutes). These transmissions can result in bandwidth wastage and may not provide any particular advantage for the user or the datacenter.

In contrast to existing techniques described above, the disclosed systems may not use the RPO as a migration parameter. Instead of performing online synching at regular synchronization intervals based on RPO or similar metric, the disclosed systems can initially use larger synchronization intervals for online synching. The disclosed systems can gradually reduce the synchronization intervals as the switchover window approaches. Because the synchronization can be initially performed at larger synchronization intervals, changing data blocks can be sent less frequently between the source node and destination node, reducing bandwidth usage. Additionally, as the switchover window approaches, the online synchronization process can occur at smaller synchronization intervals. Accordingly, once the switchover window is reached, the disclosed systems can migrate VMs from the source to destination rapidly.

FIG. 1A is a flowchart of an example method for data migration using VM replication. At stage 102, the method can include identifying, on a network, a source node and a destination node, the source node including at least one source node VM to be replicated as a destination node VM on the destination node.

The disclosed systems can verify that the source node VM is in a stable state with its current host. Further, the disclosed systems can determine that a host on the destination node for the destination node VM meets compatibility requirements so that the migration can proceed. In some examples, the disclosed systems can encapsulate the state of the source node VM by a set of files stored on shared storage. The disclosed systems can configure a corresponding file system for the VM to allow for the destination node to access the source node VM files.

At stage 104, the method can include copying disks used by the source node VM in a current operational state to the destination node VM. In some examples, the copying of the disks can be performed as part of a full synchronization, where the disks and VM associated configuration files may be copied from the source node to VM to the destination node VM. In other examples, the disclosed systems can copy the source node VM's state information to the destination node VM. The state information can include the current memory content and other information that defines and identifies the source node VM. The memory content can include transaction data and the bits of the operating system and applications that are in the memory. The defining and identification information stored in the state includes data that maps to the VM's corresponding hardware elements. Non-limiting examples of such hardware elements include basic input/output systems ("BIOSs"), devices, processors, medium access control ("MAC") addresses for Ethernet cards, chip set states, registers, and the like.

The disclosed systems can transfer the active memory and precise execution state of the source node VM over the network (for example, a gigabit Ethernet network). This transfer can allow the source node VM to switch from running on a server associated with the source node to a server associated with the destination node. If errors occur during the copying of the disks, the disclosed systems can revert the source node VM to its original state and location on the source node.

At stage 106, the method can include scheduling start times for multiple update synchronizations of changed data between the source node VM and the destination node VM. The start times can be scheduled at different time intervals such that a first time interval is greater than a second time interval. In this way, time intervals can start off being longer and then step down to shorter intervals, in an example. A time interval can indicate the amount of time between starts of data transmission periods. For synchronization, the disclosed systems can track data changes on disk sectors associated with the disks used by the source node VM and transfer the data changes to the destination node VM. The synchronization of the data may not necessarily be performed in a uniform set of synchronization intervals as defined, for example, by an RPO, an RTO, or the like. Instead, the synchronization intervals can be non-uniform, and can be, for example, decreasing over time. In some examples, the disclosed systems can reduce the respective durations of the multiple synchronization intervals at a predetermined rate from a maximum synchronization interval duration to a minimum synchronization interval duration. In other examples, as shown and described in connection with FIG. 6, below, the disclosed systems can reduce the synchronization intervals in a linear fashion from the maximum synchronization interval duration to the minimum synchronization interval duration. Further, the number of the multiple synchronization intervals or respective durations of the multiple synchronization intervals can be based on various network factors, including a network latency or a data synchronization bandwidth usage.

At stage 108, the method can include performing, at a switch-over time, a shutdown of the source node VM and transmitting data changes that are pending on the disk to the destination node. In some examples, the disclosed systems can keep track of on-going memory transactions in a bitmap. Once the entire memory and system state associated with the source node VM has been copied over to the destination node, the disclosed systems can suspend the source node VM, can copy the bitmap to the destination node, and can resume the destination node VM on the destination node.

In some examples, the disclosed systems can also virtualize the networks used by the source node VM. Accordingly, after migration, the source nodes VM's network identity and network connections can be preserved. For example, the disclosed systems can maintain a virtual MAC address associated with the source node VM as part of the migration process. Once the destination node VM is activated, the disclosed systems can access a corresponding network router to ensure that it is aware of the new physical location of the virtual MAC address. The disclosed systems can preserve the execution state, the network identity, and the active network connections associated with the source node VM in order to reduce the downtime and minimize associated disruptions to users.

Figure 1B:
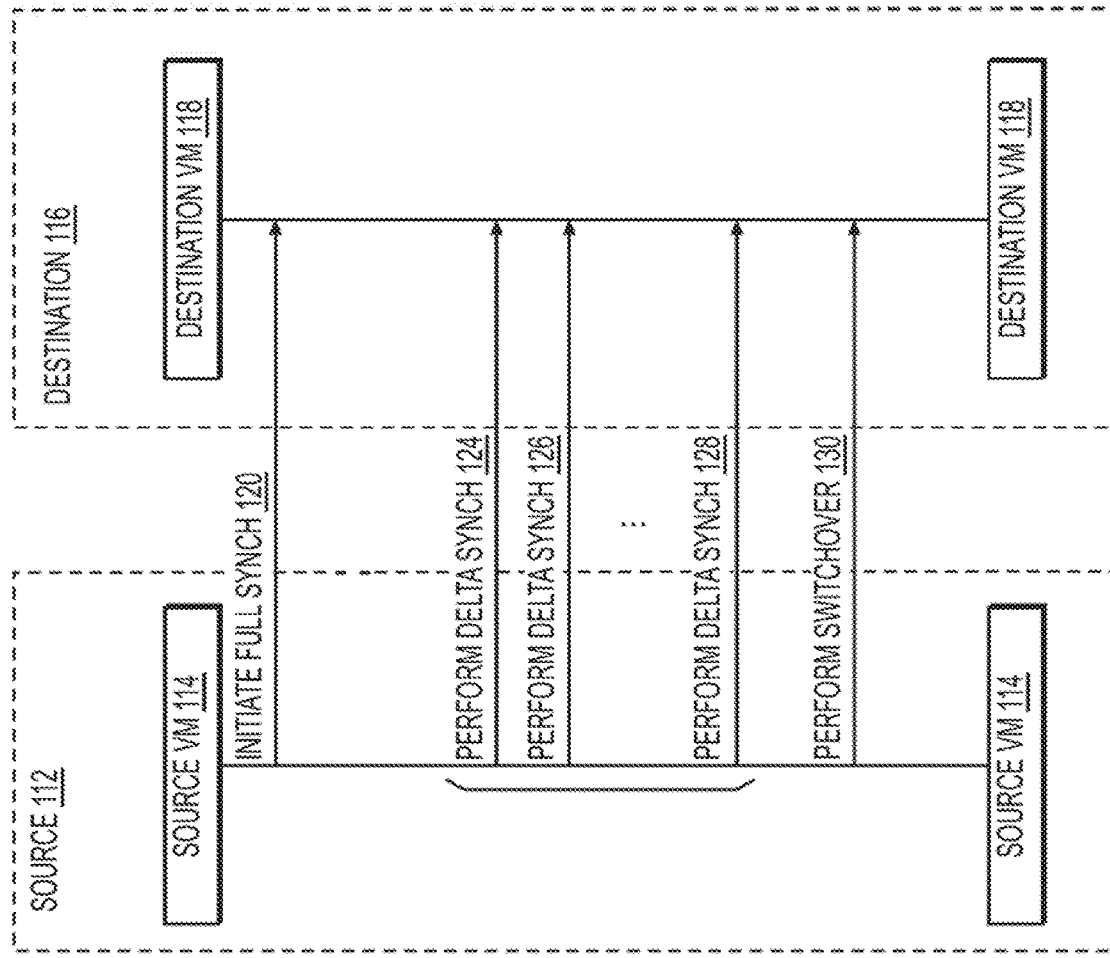
FIG. 1B is an example sequence diagram of example stages for performing data migration using VM replication.

FIG. 1B is an example sequence diagram of example stages for performing data migration using VM replication. Diagram 101 includes components such as source 112 and destination 116. Source 112 can represent a data store on a datacenter, and destination 116 can represent a cloud-based system (for example, a public-cloud system, a private cloud system, or a hybrid-cloud system). Source 112 can include a source node VM 114. Destination 116 can include a destination node VM 118.

The disclosed systems can include an software-based agent (not shown) that can track and send data from a source node VM 114 to the destination node VM. The disclosed systems can use the agent to manage and monitor the replication process. The agent can interface with administrators to provide them with visibility into VM status.

At stage 120, the source node VM 114 can initiate a full synchronization. The disclosed systems can initiate the replication with the full synchronization transfer to the destination node. The time it takes to perform the full synchronization can be a function of the size of the source node VM 114 and available bandwidth on the network, among other factors. Further, the bandwidth consumption can vary depending on how associated workloads change blocks on the disk.

In some examples, the disclosed systems can perform an initial full synchronization of the source node VM 114 and its replica copy. If desired, a seed copy of data can be placed at the destination node to minimize the time and bandwidth required for the first replication. A seed copy of the source node VM 114 can include a VM disk file that can be positioned at the destination node. The seed copy can be positioned using offline copying, a file transfer protocol ("FTP") process, an ISO image or a VM clone.

At stages 124, 126, etc. through stage 128, the source node VM 114 can initiate an online synchronization. The full synchronization described above can occur while a VM is powered on. In some examples, an online synchronization can also be referred to as a delta synchronization. Similarly, scheduled or manually initiated synchronization while a VM is powered on can be considered an online synchronization. The online synchronization can be performed to reduce VM downtime. Accordingly, the disclosed systems can keep the source node VM 114 online during the replication and can bootstrap the source node VM 114 on the destination node after replication completes.

In some examples, when the full synchronization is finished, the disclosed systems can perform a delta synchronization by transferring changed data between the source node VM 114 and the destination node VM 118. The disclosed systems can track writes to the source node VMs, and can identify and replicate those blocks that have changed between replication cycles. Further, the delta synchronization can be performed between the source node VM 114 and the destination node VM 118 multiple times over multiple synchronization intervals, the multiple synchronization intervals including a first synchronization interval that is greater than a second synchronization interval. The disclosed systems can reduce respective durations of the multiple synchronization intervals at a predetermined rate from a maximum synchronization interval duration to a minimum synchronization interval duration. The delta synchronization can thereby minimize network traffic.

At stage 130, the source node VM 114 can perform a switchover. The disclosed systems can perform the switchover when the delta synchronization is finished. In some examples, the disclosed systems can implement the switchover immediately or can delay the switchover until a predetermined time.

Following the switchover, the disclosed systems can shut down the source node VM 114, and the migrated replica represented by the destination node VM 118 can be powered up. If destination node VM 118 cannot power on, the destination node VM 118 can be powered off and the source node VM 114 can be powered on. The disclosed systems can rename the shut down source node VM 114 to avoid a naming conflict with the destination node VM 118. For example, the disclosed systems can append a binary timestamp to the source node VM 114 name. the disclosed systems can provide the source node VM 114 with a new MAC address.

Figure 2:
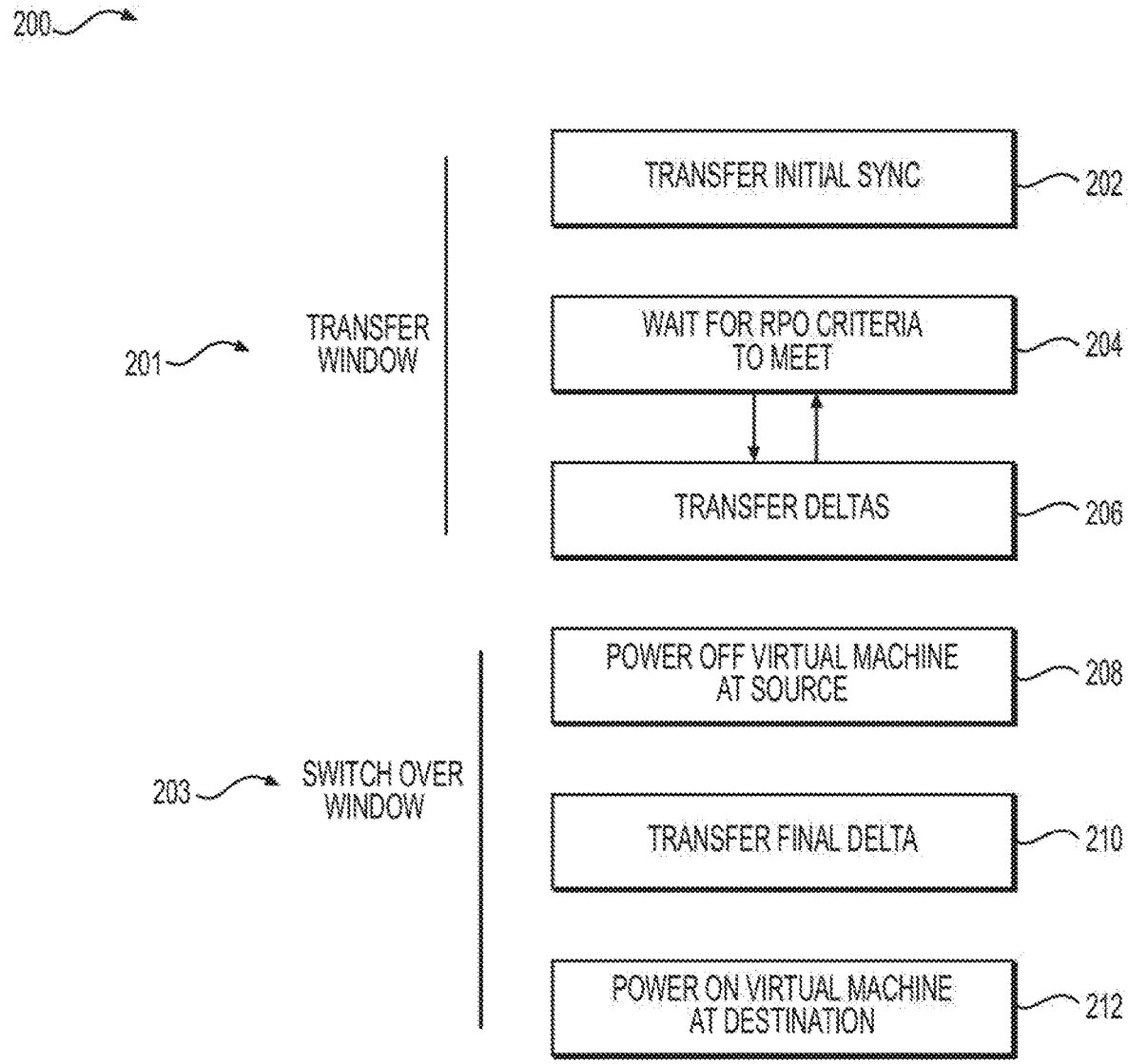
FIG. 2 is another flowchart of an example method for VM replication.

FIG. 2 is another flowchart of an example method for VM replication.

As depicted in diagram 200, the disclosed systems can perform data migration processes during a synchronization interval during called a transfer window 201.

At stage 202, the disclosed systems can transfer an initial synchronization. In some examples, the initial synchronization can be part of a full synchronization. The amount of time it takes the disclosed systems to complete a full synchronization primarily depends on the size of the virtual disks associated with the source node VM, the amount of data that must be replicated, and the network bandwidth available for replication.

At stage 204, the disclosed systems can wait for an RPO criteria to be met. As noted, the disclosed systems can replicate changes on a regular basis depending on the a RPO configured for the source node VM. For example, the disclosed systems can replicate changed data in a VM with an RPO of four hours approximately every four hours. This schedule can change based on a number of factors such as data change rates, how long a given replication cycle takes as determined by the RPO criteria, and how many VMs are configured for replication. The disclosed systems can use an algorithm that considers these factors and can schedules replication accordingly to help ensure the RPO for a given replicated virtual machine is not violated.

At stage 206, the disclosed systems can transfer deltas representing changes in the data blocks. The disclosed systems can track changes to virtual disks belonging to the source node VM. For example, the disclosed systems can compare the contents of a source node VM's virtual disk and a corresponding destination node VM's virtual disk using checksums or other suitable error checking mechanism. Checksums can refer to a digit representing the sum of the correct digits in a piece of stored or transmitted digital data, against which later comparisons can be made to detect errors in the data. The comparison process can identify differences between the source node VM and the destination node VM. Comparing the virtual disks associated with the source node VM and the destination node VM can involve reading the entire contents of each disk and the generation of checksums. Creating and comparing the checksums of the source and target can make use of processor cycles. While checksum comparisons are being calculated and compared, the disclosed systems can periodically send any differences that were discovered.

As further depicted in diagram 200, the disclosed systems can end the data migration processes and transfer the VMs from the source node to the destination node during a switchover window 203.

At stage 208, the disclosed systems can power off the source node VMs, and at stage 210, the disclosed systems can transfer a final delta representing final changes in the data blocks. Further, at stage 212, the disclosed systems can power on the destination node VM.

The disclosed systems can move the VM to a new host and the virtual disk can be moved to the corresponding datastore on the destination node. After the source node VM is migrated to the destination node, the VM can be executed on the destination node. As noted, following the switchover, the source node VM can be powered off, and the migrated destination node VM can be powered on. If for some reason the destination node VM cannot be power on, the destination node VM can be powered off and the source node VM can be powered on.

Figure 3:
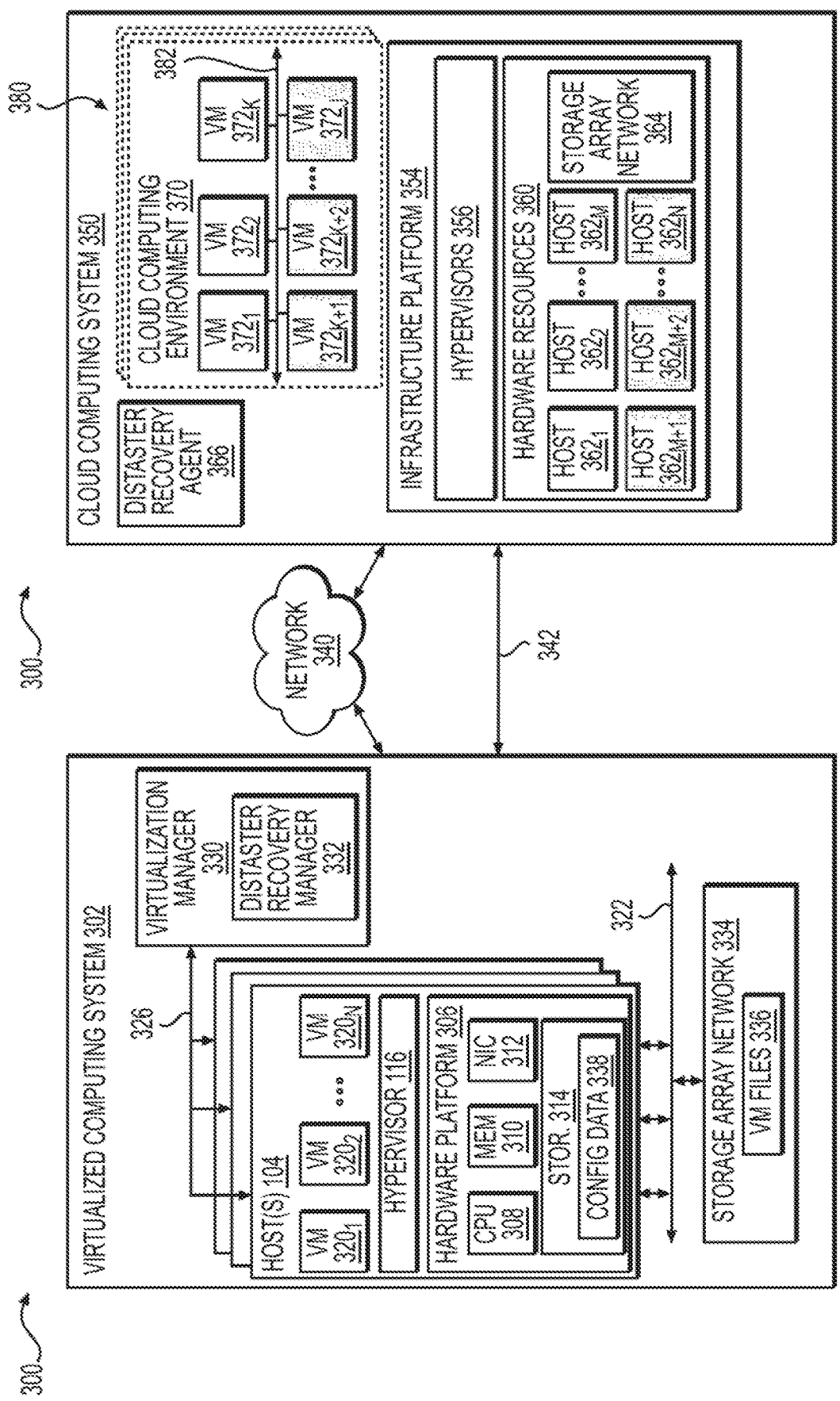
FIG. 3 an example system diagram of data migration between data centers.

FIG. 3 is a block diagram of a computing system 300 in which embodiments of the present disclosure can be utilized. The computing system 300 can perform data migration between data centers. Computing system 300 includes a virtualized computing system 302 and a cloud computing system 350. Virtualized computing system 302 is also referred to as a "primary computing system" or a "production computing system." In operation, a protected virtualized computing environment in virtualized computing system 302 can be replicated to cloud computing system 350 to implement a disaster recovery (DR) scheme. Cloud computing system 350 can also be referred to as a secondary computing system. In general, replication can encompass copying data from the primary computing system to the secondary computing system continuously or periodically so that a resulting virtualized computing environment in the secondary computing system is a replica or substantial replica of the protected virtualized computing environment in the primary computing system.

Virtualized computing system 302 can communicate with cloud computing system 350 over a network 340 (for example, a shared network, such as the public Internet), over a direct connection 342 (for example, a private point-to-point link), or over both network 340 and direction connection 342. Virtualized computing system 302 includes one or more host computer systems 304 (also referred to as hosts 304). Hosts 304 can be constructed on a server grade hardware platform 306, such as an x86 architecture platform, a desktop, a laptop, and the like. As shown, hardware platform 306 of each host 304 can include conventional components of a computing device, such as central processing units ("CPUs") 308, system memory 310, a network interface 312 (also referred to as a network interface controller ("MC") 312), storage 314 (also referred to as local storage 314), and other I/O devices such as, for example, a mouse and keyboard (not shown). Each of CPUs 308 is configured to execute instructions, for example, executable instructions that perform one or more operations described herein and can be stored in memory 310 and in local storage 314. Memory 310 is a device allowing information, such as executable instructions, cryptographic keys, virtual disks, configurations, and other data, to be stored and retrieved. Memory 310 can include, for example, one or more random access memory (RAM) modules, read only memory (ROM), or a combination thereof. Network interface 312 enables each host 304 to communicate with another device by a communication medium, such as a network 322 (for example, local area network ("LAN")) within virtualized computing system 302. Network interface 312 can be one or more network adapters. Storage 314 represents local storage devices (for example, one or more hard disks, flash memory modules, solid state disks, and optical disks) or a storage interface that enables host 304 to communicate with one or more network data storage systems. Examples of a storage interface are a host bus adapter ("HBA") that couples each host 304 to one or more storage arrays, such as a storage area network ("SAN") or a network-attached storage ("NAS"), as well as other network data storage systems. In the example, hosts 304 are configured for communication with SAN 334 over network 322.

Each host 304 can be configured to provide a virtualization layer that abstracts processor, memory, storage, and networking resources of hardware platform 306 into multiple VMs 320 1 to 120 N (collectively referred to as VMs 320) that run concurrently on the same hosts. VMs 320 run on top of a software interface layer, referred to herein as "virtualization software," which enables sharing of the hardware resources of host 304 by VMs 320. In the example, the virtualization software can include a hypervisor 316. One example of hypervisor 316 that can be used in an embodiment described herein is a ESXI hypervisor provided as part of the VSPHERE solution made commercially available from VMWARE. Hypervisor 316 can run on top of the operating system of a host 304 or directly on hardware components of a host 304.

Each of VMs 320 is implemented by a set of files, such as a VM configuration file, virtual disk file(s), log file(s), snapshot file(s), and the like ("VM Files"). An example VM configuration file is a .vmx file in a ESXI hypervisor implementation. In general, a VM configuration file can be a text file that includes various defined parameters specifying local behavior of the VM (for example, the number of CPUs assigned, the amount of memory assigned, the guest operating system deployed therein, etc.). An example virtual disk file is a .vmdk file in a ESXI hypervisor implementation. In general, a virtual disk file is a container file for a virtual hard disk drive. The VM files are stored in one or more datastores accessible by hypervisor 316. Datastores can be stored on local storage 314 accessible by a single host 304 (local datastores), in SAN 334 accessible by multiple hosts 304 (shared datastores), or both. In the example shown in FIG. 3, SAN 334 includes VM files 336 that implement VMs 320.

Hypervisor 316 can be implemented by a set of persistent files stored as part of a system image, that is, a hypervisor system image. A hypervisor system image can include, among other files, boot files for booting hypervisor 316; installation files for implementing a kernel, kernel modules, device drivers, and applications/services of hypervisor 316; and configuration files that establish a persistent configuration of hypervisor 316. Notably, the configuration files in the hypervisor system image include configuration data for hypervisor 316, such as network address, hostname, and the like, as well as an inventory of VMs registered with hypervisor 316. The configuration data can also include information related to global behavior of VMs 320, such as which VMs 320 belong to specific groups (for example, clusters, resource groups, etc.), which VMs 320 are enabled for disaster recovery ("DR"), which VMs 320 are enabled for high-availability ("HA"), which VMs 320 are enabled for replication, and the like. Hypervisor 316 can save the configuration data on persistent storage (for example, with hypervisor system image) so that the configuration data persists when hypervisor 316 is shutdown or rebooted. In the example, local storage 314 stores configuration data 338. Configuration data 338 can include configuration data for hypervisor 316. Configuration data 338 can also include configuration data for global behavior of VMs 320.

Virtualized computing system 302 includes a virtualization management module (depicted in FIG. 3 as virtualization manager 330) that can communicate with the plurality of hosts 304 by a network, sometimes referred to as a management network 326. In one embodiment, virtualization manager 330 is a computer program that resides and executes in a central server, which can reside in virtualized computing system 302, or alternatively, running as a VM in one of hosts 304. One example of a virtualization management module is the VCENTER SERVER product made available from VMWARE. Virtualization manager 330 can be configured to carry out administrative tasks for virtualized computing system 302, including managing hosts 304, managing VMs 320 running within each host 304, provisioning VMs, migrating VMs from one host to another host, and load balancing between hosts 304.

Virtualization manager 330 can include a disaster recovery manager 332 configured to setup and manage a disaster recovery scheme for the virtualized environment of virtualized computing system 302. Disaster recovery manager 332 can be used designate protected virtual machines of VMs 320. Based on the designated protected virtual machines, disaster recovery manager 332 initiates replication of a virtualized computing environment encompassing the protected virtual machines to cloud computing system 350. Replication includes replication of VM files that implement the protected virtual machines (for example, VM files 336) and replication of configuration data for hypervisor 316 or VMs 320 (for example, configuration data 338). In another embodiment, disaster recovery manager 332 can be separate from virtualization manager 330. For example, disaster recovery manager 332 can be a computer program that resides and executes in a central server, which can reside in virtualized computing system 302, or alternatively, running as a VM in one of hosts 304.

Cloud computing system 350 includes an infrastructure platform 354 upon which cloud computing environment(s) 370 can be executed. Each cloud computing environment 370 includes a plurality of virtual machines 372 1 through 372 K (collectively, VMs 372). Cloud computing environment(s) 370 can also include other virtual resources, such as one or more virtual networks 382 used to communicate between VMs 372. VMs 372 provide abstractions of processor, memory, storage, and networking resources of hardware resources 360. Virtual networks 382 provide abstractions of networks, such as local area networks ("LANs"), wide area networks ("WANs"), and the like. At a given time, some VMs 372 can be active (for example, executing) while other VMs 372 are inactive (for example, not executing). For example, VMs 372 that are replicas of VMs 320 protected in virtualized computing system 302 are inactive while VMs 320 are active. As shown in FIG. 3, VMs 372 1 through 372 J are inactive (where J is a positive integer less than K). In an example, a cloud computing environment 370 can provide a virtualized computing environment 380 replicated from virtualized computing system 302. In such case, unless failover has occurred, all VMs 372 in virtualized computing environment 380 are inactive.

Infrastructure platform 354 includes hardware resources 360 and virtualization software (for example, hypervisors 356). Hardware resources 360 include computing resources, storage resources, network resources, and the like. In the embodiment shown, hardware resources 360 include a plurality of host computers 362 1 through 362 N (collectively host computers 362) and a SAN 364. Hardware resources 360 are configured in a manner to provide hypervisors 356 that support the execution of VMs 372 across host computers 362. Hypervisors 356 can be implemented similarly to hypervisors 316 in virtualized computing system 302.

An application (for example, disaster recovery manager 332 or virtualization manager 330) can access virtualization software on host computers 362 through platform management systems in host computers 362. A platform management system is an autonomous computing subsystem in a host computer that provides management and monitoring capabilities independent from the host's CPU, firmware, and operating system. A platform management system can include a subsystem having its own processor, memory, network connection, and access to the system bus of the host. Notably, a platform management system is operable even when a host computer is in a low-power state. As such, a client application can access virtualization software through platform management systems of host computers 362 regardless of whether hosts 362 are powered on or in a low-power state.

Cloud computing system 350 can also include a disaster recovery agent 366 that cooperates with disaster recovery manager 332 to orchestrate the DR scheme (for example, replication of VM files 336 and configuration data 338). Virtualization manager 330 or disaster recovery manager 332 can access hosts 362 through disaster recovery agent 366. In another embodiment, virtualization manager 330 or disaster recovery manager 332 can access hosts 362 directly over network 340 or direct connection 342.

Figure 4:
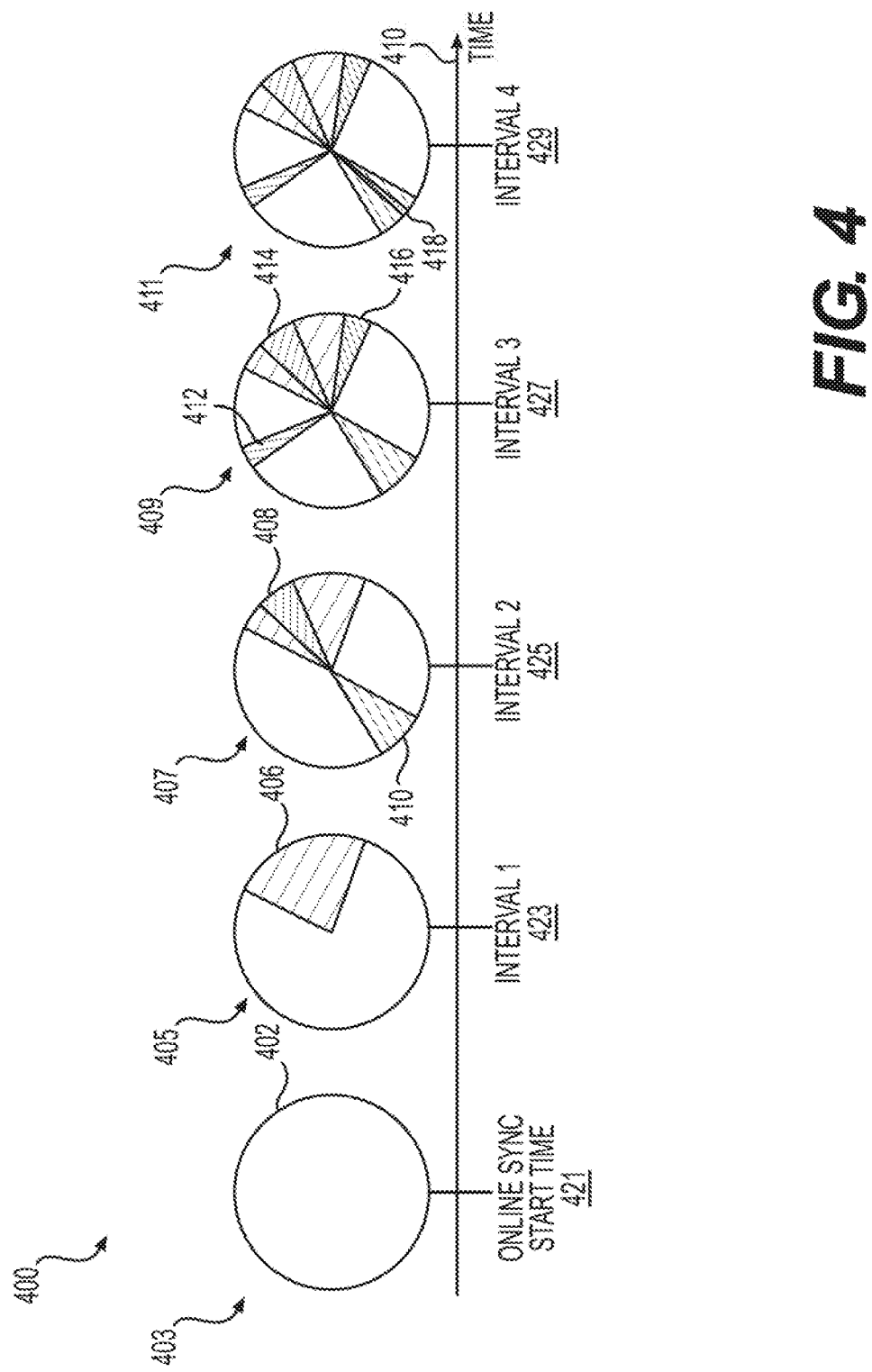
FIG. 4 is an illustration of an example of synchronizing data stored on disk sectors of disks for VM replication.

FIG. 4 is an illustration of example synchronizing data stored on disk sectors of disks for VM replication. Diagram 400 shows a time lapse of disk sector changes at the end of different synchronization intervals based on a user-configurable parameter such as an RPO.

Diagram 400 further illustrates a representative underlying disk 402 associated with a source node VM, the underlying disk 402 having changing disk sectors. Geometrically, a sector (such as sector 406) can be depicted as a portion of the disk 402 between a center, two radii and a corresponding arc which can be shaped like a slice of a pie. While the example shown in diagram 400 includes disk sectors, it is to be understood that this is just a graphical representation. The disk can be virtual or physical and operate using any suitable storage mechanism, including but not limited to, solid-state drives, optical drives, and the like.

In this example, the disk sectors can change over four consecutive synchronization intervals (synchronization interval 1 423, synchronization interval 2 425, synchronization interval 3 427, and synchronization interval 4 429). The synchronization intervals can occur at respective stages, that is, stage 403, stage 405, stage 407, stage 409, and stage 411. At stage 403, no disk sectors of underlying disk 402 have yet changed on a source node VM. Accordingly, the disclosed systems can initiate the online synchronization process at the online synchronization start time 421. Continuing with this example, at stage 405, a first sector 406 can undergo changes on the underlying disk 402 at synchronization interval 1 423. At stage 407, a second sector 408 and a third sector 410 can undergo changes on the underlying disk 402 at synchronization interval 2 425. At stage 409, a fourth sector 412, a fifth sector 414, and a sixth sector 416 can undergo changes on the underlying disk 402 at synchronization interval 3 427. At stage 411, a seventh sector 418 can undergo changes on the underlying disk 402 at synchronization interval 4 429.

Figure 5:
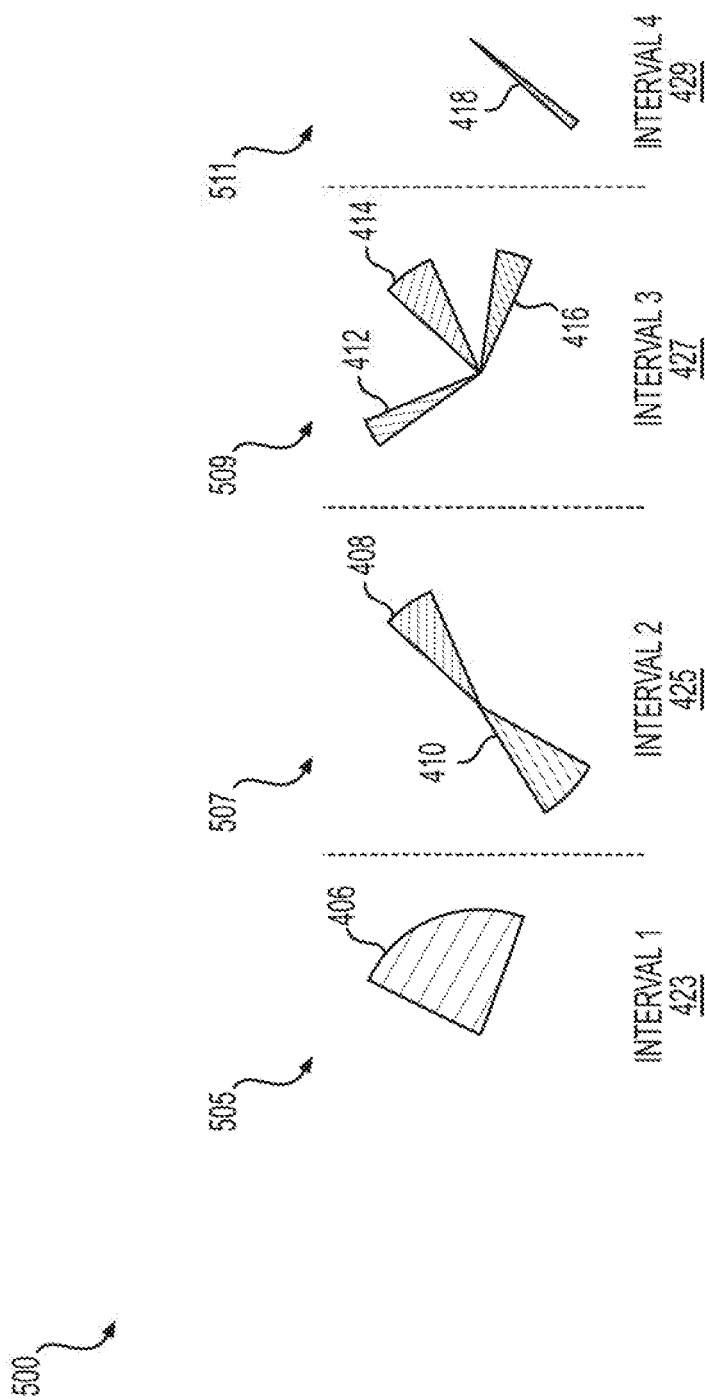
FIG. 5 is an illustration of example of copied disk sectors used for VM replication.

FIG. 5 is an illustration of example of disk sectors copied for VM replication. Diagram 500 illustrates the disk sectors that are transferred at the end of each of the synchronization intervals of FIG. 4 (synchronization interval 1 423, synchronization interval 2 425, synchronization interval 3 427, and synchronization interval 4 429). The amount of data that is synchronized can be represented as the difference of previous and current disk images on the underlying disk 402.

Diagram 500 illustrates that there are common disk sector changes in synchronization interval 1 423, synchronization interval 2 425, and synchronization interval 3 427. For example, sectors 406 and 408 have common data (as represented by the overlapping area) between stages 505 and 507 corresponding to synchronization interval 1 423 and synchronization interval 2 425. Similarly, sectors 410 and 418 have common data between stages 507 and 511 corresponding to synchronization interval 2 425 and synchronization interval 4 429. Conventional systems can send these common disk sector changes multiple times to satisfy the replication timing constraints. Such constraints can be imposed by an RPO or a similar parameter that can be used to determine the duration of the synchronization intervals.

Further reference is now made to the example depicted in diagrams 400 and 500 of FIGS. 4 and 5, respectively. If a longer synchronization interval were selected equaling four times the depicted synchronization intervals, a replication system can synchronize the data once during a migration. In such a case, the amount of data synchronized can be equal to the net difference between the first sector 406 and the fourth sector 418. Accordingly, the disclosed systems can send the fourth sector 418 once to perform data synchronization in this example that makes use of a longer synchronization interval. This less-frequent performing of synchronization is in contrast to performing synchronization multiple times, as in the case of a replication system using relatively shorter synchronization intervals as depicted in diagrams 400 and 500. In some examples, a longer synchronization interval that has a duration greater than or equivalent to the switchover window time can be unsuitable, as the disclosed systems may not be able to complete migration for such synchronization intervals.

The disclosed systems can dynamically configure larger synchronization intervals initially and can gradually reduce the synchronization intervals to smaller synchronization intervals as the switchover window approaches. The disclosed systems can perform this dynamic configuration of synchronization intervals instead of performing online synchronization at regular synchronization intervals based on RPOs. Accordingly, the disclosed systems can initially transmit changing data blocks less frequently between the source node VM and the destination node VM, reducing bandwidth usage on the network. Additionally, as the switchover window approaches, the disclosed systems can perform online synchronization more frequently and at shorter synchronization intervals. In this way, once the switchover window is reached, the disclosed systems can be ready to migrate VMs from the source to destination rapidly.

Figure 6:
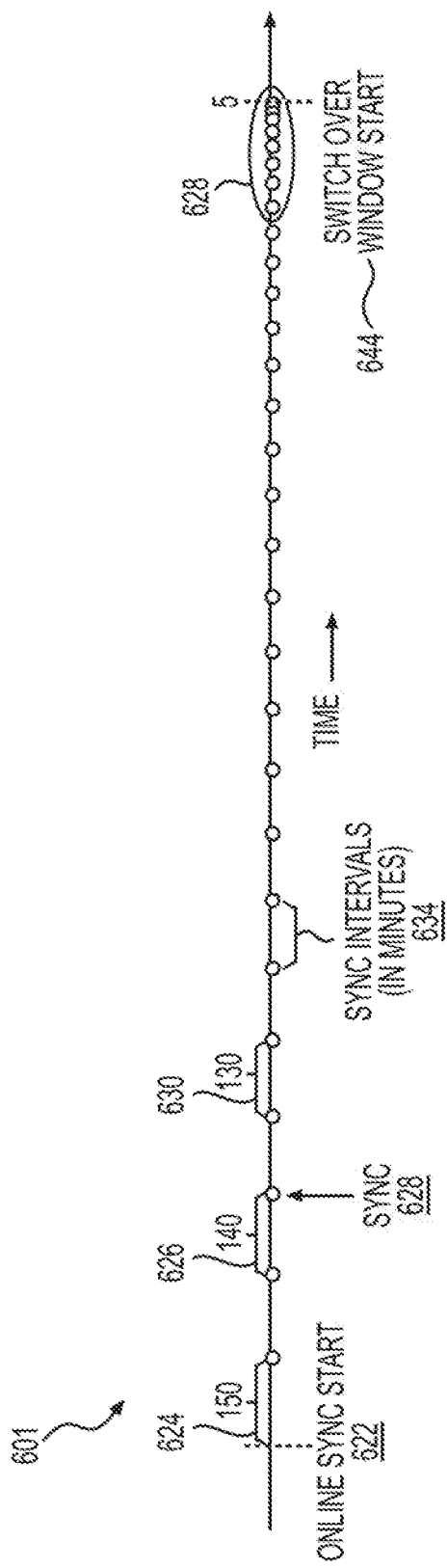
FIG. 6 is an illustration of an example chart for reduction of respective durations of the multiple synchronization intervals at a predetermined rate from a maximum synchronization interval duration to a minimum synchronization interval duration in order to perform VM replication.

FIG. 6 is another illustration of a reduction of respective durations of the multiple synchronization intervals for VM replication. Diagram 601 plots the synchronization times and synchronization intervals in a linear time axis. Diagram 601 shows an online synchronization start time 622 and illustrates the synchronization intervals 634 in minutes. Further, an synchronization interval 624 that lasts 150 minutes, synchronization interval 626 that lasts 140 minutes, synchronization interval 630 that lasts 130 minutes. As is shown in diagram 601, synchronization intervals that occur immediately after the online synchronization start time 622 (for example, synchronization intervals 624, synchronization intervals 626, and synchronization intervals 630) can have a relatively longer duration as compared with synchronization intervals that occur immediately before the switchover window start time 644 (for example, synchronization intervals 628).

More specifically, diagram 601 can represent an example VM migration according to the following schedule. (1) The VM migration starts at Nov. 21, 2019 10:00:00 AM. (2) The online synchronization starts at Nov. 22, 2019 7:15:00 AM. (3) The switchover window starts at Nov. 23, 2019 22:00:00 PM. (4) The switchover window ends at Nov. 24, 2019 00:30:00 AM. The switchover window can include a maintenance window of about 150 minutes.

For this example, a conventional migration process may need to synchronize data 465 times using an RPO of 5 minutes. Using the disclosed embodiments, the disclosed systems can have a starting synchronization interval of 150 minutes, which can be equivalent to the switchover window. The starting synchronization interval can be reduced by 5 minutes for every consecutive synchronization interval. Accordingly, the data may need to be synchronized 30 times, assuming the minimum synchronization interval is 5 minutes.

As noted, the minimum RPO supported in the above example was 5 mins. In some examples, the disclosed systems can set the last synchronization interval to be same as minimum supported RPO. Accordingly, the synchronization intervals can be reduced in such a way that the last synchronization interval is about 5 mins. For example, the disclosed systems can reduce synchronization intervals by 5 mins every cycle. The sum of the synchronization intervals can be equal to an online synchronization window duration. Accordingly, the following relationship can hold: the sum of 5+10+ . . . +5n can be equal to the difference between the switchover window start time and the online synchronization start time (that is, 5+10+ . . . +5n=(switchover window start time−online synchronization start time). In this case, "5n" can refer to the synchronization interval of first cycle and "n" can refer to the number of synchronization intervals. Solving this for n can yield equation 1, below, where T=(switchover window start time−online synchronization start time).

$$n = \frac{-1 \pm \sqrt{1 + \frac{8T}{5}}}{2} \quad \text{Equation 1}$$

In this example T can be equal to 2,325 minutes. Substituting this value for T in above equation yields n=30. Accordingly, the starting synchronization interval can be approximately 150 mins. With the approach described above, the data between the source node and the destination node may need to be synchronized 30 times compared to 465 syncs with conventional approaches.

In one example, the disclosed systems can determine the synchronization intervals based on VM disk change rate instead of using pre-defined fixed synchronization intervals. The following non-limiting parameters can used to determine the synchronization intervals. (1) The size of modified disk sectors (that is, the deltas of the disk sectors corresponding to the changes in data blocks associated with a source node VM). Because the disclosed systems can monitor the disk changes, the disclosed systems can determine the size of the modified disk sectors. (2) The approximate available bandwidth for a source node VM or a destination node VM. The available bandwidth for the VM can be based on a pipeline bandwidth and on other VMs data migration schedules. (3) The tolerance time, that is, the maximum time allowed for the transfer of the delta of the disk sectors associated with the source node VM. The maximum time can be determined based on the maintenance window. The larger the tolerance time, the larger the disclosed systems can configure the synchronization intervals. (4) The buffer time for data transfer between the source node VM and the destination node VM. During the buffer time, the disclosed systems can switch back to an existing method where the disclosed systems can transfer the deltas based on the predetermined RPO. Accordingly, as the switchover window approaches, the source node VM can be ready to migrate irrespective of network fluctuations. (5) The minimum synchronization interval which can refer to the minimum time needed to wait for synchronizing the delta. For example, certain replication software tool (for example, VSPHERE by VMWARE) can have a minimum synchronization interval of about 5 minutes (that is, an RPO of about 5 minutes). Accordingly, at predefined synchronization intervals (for example, one-minute synchronization intervals), the disclosed systems can determine whether to send the deltas representing disk sector changes or not based on certain calculations. The disclosed systems can first determine approximately how much time it can take to transfer data between the source node VM and the destination node VM. Then the disclosed systems can determine a time to transfer between the source node VM and the destination node VM using the following equation:

$$\text{time to transfer} = \frac{\text{delta}}{\text{approximate available bandwidth for the } VM} \quad \text{Equation 2}$$

where delta represents the change in the data sectors on the source node VM.

Figure 7:
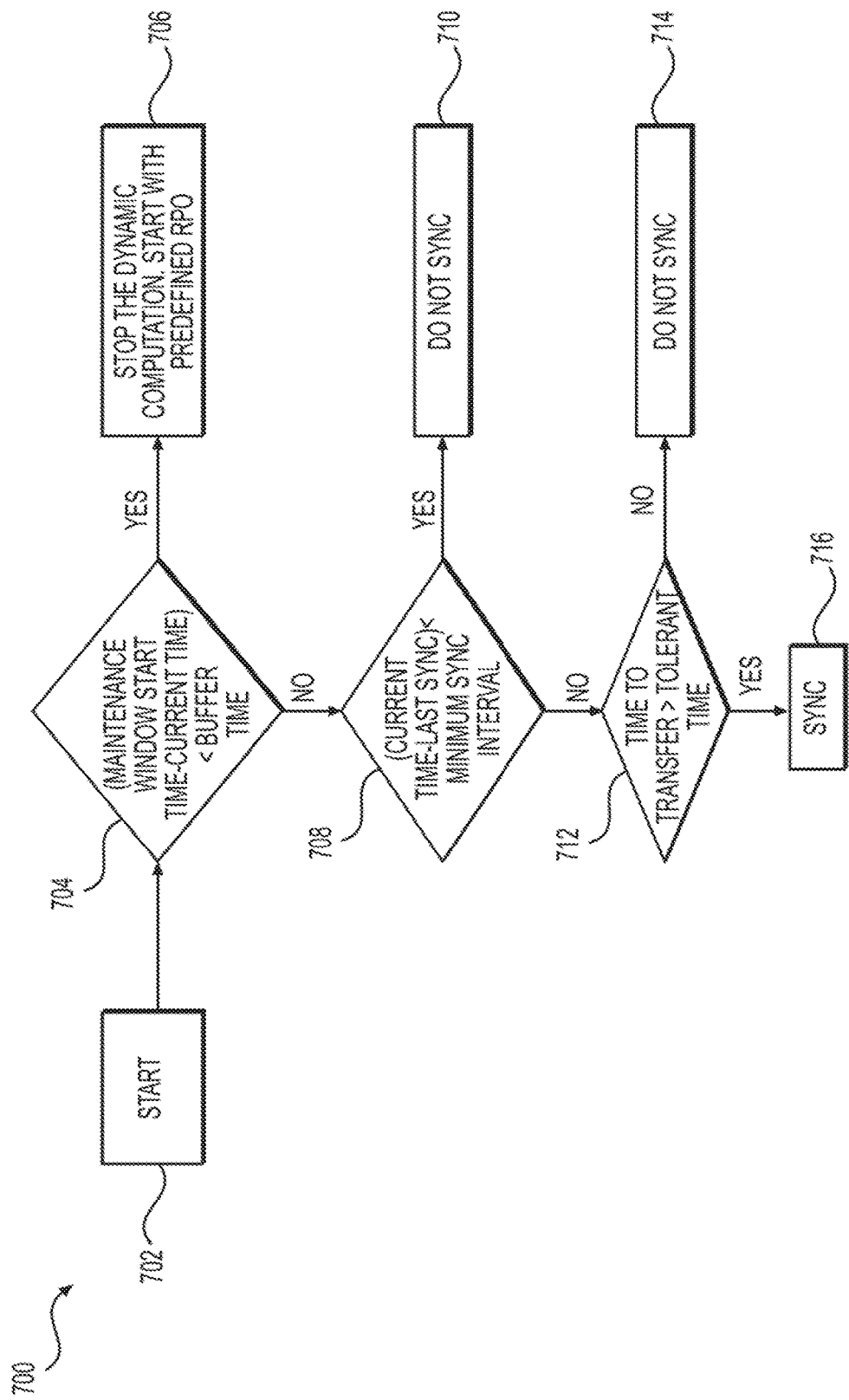
FIG. 7 is an example flowchart of an example method for synchronization.

FIG. 7 illustrates a flow chart that details example operations for determining to perform a delta synchronization. The operations illustrated in diagram 700 can commence at stage 702, which can refer to any suitable time for performing a potential synchronization. At stage 704, the disclosed systems can determine whether a value is less than the buffer time. The value can be the difference between a maintenance window start time and a current time. If so, the disclosed systems can, at stage 706, stop the dynamic computation and start the migration using the predefined RPO. If not, the disclosed systems can, at stage 708, perform a calculation to determine whether a value of a difference between a last synchronization time and a current time is less than the minimum synchronization interval. If so, then the disclosed systems can, at stage 710, determined not to perform the synchronization. If not, the disclosed systems can, at stage 712, determine whether a time to transfer the data associated with the source node is greater than a predetermined tolerance time. If not, the disclosed systems can determine, at stage 714, determine not to perform the synchronization. If yes, the disclosed systems can, at stage 716, determine to perform the synchronization.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for virtual machine ("VM") replication, comprising:
   identifying, on a network, a source node and a destination node, the source node including at least one source node VM to be replicated as a destination node VM on the destination node;
   performing a full synchronization by copying disks used by the source node VM in a current operational state to the destination node VM;
   scheduling start times for multiple update synchronizations of changed data between the source node VM and the destination node VM, the start times being scheduled at different time intervals, wherein a first time interval is greater than a second time interval;
   reducing respective durations of the different time intervals such that each successive different time interval is shorter than a preceding different time interval, the reductions being at a predetermined rate from a maximum duration to a minimum duration; and performing, at a switch-over time, a shutdown of the source node VM and transmitting data changes that are pending to the destination node.

2. The method of claim 1, wherein a number of the multiple update synchronizations or respective durations of the different time intervals are based on at least one of a network latency or a data synchronization bandwidth usage.

3. The method of claim 1, wherein the disks comprise disk sectors, and wherein the scheduling start times further comprises:
tracking data changes on the disk sectors and transferring the data changes to the destination node VM.

4. The method of claim 3, wherein the source node is located in a source data center and the destination node is located in a destination data center that is geographically separated from the source data center.

5. The method of claim 3, wherein the scheduling start times further comprises calculating that a time to transfer changed data is greater than or equal to a tolerance time.

6. The method of claim 1, wherein scheduling start times further comprises calculating that a difference between a maintenance window start time and a current time is greater than or equal to a buffer time.

7. A system for virtual machine ("VM") replication, comprising:
a non-transitory, computer-readable medium containing instructions; and
a processor that executes the instructions to perform stages comprising:
identifying, on a network, a source node and a destination node, the source node including at least one source node VM to be replicated as a destination node VM on the destination node;
performing a full synchronization by copying disks used by the source node VM in a current operational state to the destination node VM;
scheduling start times for multiple update synchronizations of changed data between the source node VM and the destination node VM, the start times being scheduled at different time intervals, wherein a first time interval is greater than a second time interval;
reducing respective durations of the different time intervals such that each successive different time interval is shorter than a preceding different time interval, the reductions being at a predetermined rate from a maximum duration to a minimum duration; and
performing, at a switch-over time, a shutdown of the source node VM and transmitting data changes that are pending to the destination node.

8. The system of claim 7, wherein a number of the multiple update synchronizations or respective durations of the different time intervals are based on at least one of a network latency or a data synchronization bandwidth usage.

9. The system of claim 7, wherein the disks comprise disk sectors, and wherein the scheduling start times further comprises:
tracking data changes on the disk sectors and transferring the data changes to the destination node VM.

10. The system of claim 7, wherein the source node is located in a source data center and the destination node is located in a destination data center that is geographically separated from the source data center.

11. The system of claim 9, wherein the scheduling start times further comprises calculating that a time to transfer changed data is greater than or equal to a tolerance time.

12. The system of claim 7, wherein the scheduling start times further comprises calculating that a difference between a maintenance window start time and a current time is greater than or equal to a buffer time.

13. A non-transitory, computer-readable medium containing instructions that, when executed by a processor, performs stages for virtual machine ("VM") replication, the stages comprising:
identifying, on a network, a source node and a destination node, the source node including at least one source node VM to be replicated as a destination node VM on the destination node;
performing a full synchronization by copying disks used by the source node VM in a current operational state to the destination node VM;
scheduling start times for multiple update synchronizations of changed data between the source node VM and the destination node VM, the start times being scheduled at different time intervals, wherein a first time interval is greater than a second time interval;
reducing respective durations of the different time intervals such that each successive different time interval is shorter than a preceding different time interval, the reductions being at a predetermined rate from a maximum duration to a minimum duration; and
performing, at a switch-over time, a shutdown of the source node VM and transmitting data changes that are pending to the destination node.

14. The non-transitory, computer-readable medium of claim 13, wherein a number of the multiple update synchronization or respective durations of the different time intervals are based on at least one of a network latency or a data synchronization bandwidth usage.

15. The non-transitory, computer-readable medium of claim 13, wherein the disks comprise disk sectors, and wherein the scheduling start times further comprises:
tracking data changes on the disk sectors and transferring the data changes to the destination node VM.

16. The non-transitory, computer-readable medium of claim 13, wherein the source node is located in a source data center and the destination node is located in a destination data center that is geographically separated from the source data center.

17. The non-transitory, computer-readable medium of claim 15, wherein the scheduling start times between the source node VM and the destination node VM further comprises calculating that a time to transfer changed data is greater than or equal to a tolerance time.

18. The method of claim 1, wherein the minimum duration corresponds to a final update synchronization performed before performing the shutdown.

19. The system of claim 7, wherein the minimum duration corresponds to a final update synchronization performed before performing the shutdown.

20. The non-transitory, computer-readable medium of claim 13, wherein the minimum duration corresponds to a final update synchronization performed before performing the shutdown.

* * * * *